United States Patent [19]

Masood et al.

[11] Patent Number: 5,444,685
[45] Date of Patent: Aug. 22, 1995

[54] SECTOR MARK PATTERN DETECTION FOR OPTICAL DATA DISK CONTROLLER

[75] Inventors: Shakeel Masood, Sunnyvale; Douglas G. Gray, Santa Clara, both of Calif.

[73] Assignee: Advanced Micro Devices, Inc., Sunnyvale, Calif.

[21] Appl. No.: 252,377

[22] Filed: Jun. 1, 1994

Related U.S. Application Data

[63] Continuation of Ser. No. 75,905, Jun. 14, 1993, abandoned, which is a continuation of Ser. No. 810,576, Dec. 24, 1991, abandoned, which is a continuation of Ser. No. 807,466, Dec. 16, 1991, abandoned.

[51] Int. Cl.$^6$ .............................................. G11B 19/28
[52] U.S. Cl. ....................................... 369/47; 369/54; 360/38.1
[58] Field of Search ...................... 369/47, 48, 58, 59, 369/54, 32, 44.28, 44.32; 360/38.1, 51

[56] References Cited

U.S. PATENT DOCUMENTS

| 4,603,411 | 7/1986 | Sugiyama et al. | 369/47 |
| 4,620,300 | 10/1986 | Ogawa | 369/59 |
| 4,663,752 | 5/1987 | Kakuse et al. | 369/54 |
| 4,805,046 | 2/1989 | Kuroki et al. | 360/51 |
| 5,047,877 | 9/1991 | Herting | 360/51 |
| 5,050,013 | 9/1991 | Holsinger | 369/47 |

Primary Examiner—Scott J. Sugarman
Assistant Examiner—P. W. Huber
Attorney, Agent, or Firm—Lowe, Price, LeBlanc & Becker

[57] ABSTRACT

In a normal sector mark detection routine, using a wide open search window bits read from an optical data disk are searched for the presence of a sector mark pattern. Following detection of the pattern, using a search window of programmable width, a predefined region of the next sector is searched to locate a sector mark pattern. If the pattern is found, a sector mark found signal is generated. If the pattern is not found, a pseudo sector mark signal is generated. This sequence is repeated until either a subsequent sector mark pattern is detected, a predetermined number of pseudo sector mark signals generated or an exit command is received. Data is read from a sector in response to a sector mark found signal or pseudo sector mark signal. In a constant sector mark mode, the disk is searched, with the window wide open. Sector mark patterns are detected continuously to carry out media certification.

26 Claims, 6 Drawing Sheets

FIG-1 (BACKGROUND)

Fig. 2 (BACKGROUND)

Fig. 3

Fig. 4
(BACKGROUND)

Fig. 5
(BACKGROUND)

Fig. 6

SECTOR MARK PATTERN DETECTION FOR OPTICAL DATA DISK CONTROLLER

This application is a continuation of application Ser. No. 08/075,905, filed Jun. 14, 1993, which is a continuation of 07/810,576, filed Dec. 24, 1991, which is a continuation of 07/807,466, filed Dec. 16, 1991, all abandoned.

TECHNICAL FIELD

This invention relates generally to data recovery from optical data disks, and more particularly to data recovery from sectors of disks having missing or defective sector marks.

BACKGROUND ART

Optical disk media are capable of storing a considerable amount of data in the form of small marks or holes in the surface of the disk, each representing a bit of data. The marks, burned into the surface of the disk by a laser, are arranged along spiral tracks, each divided into a number of sectors.

Figure 5:
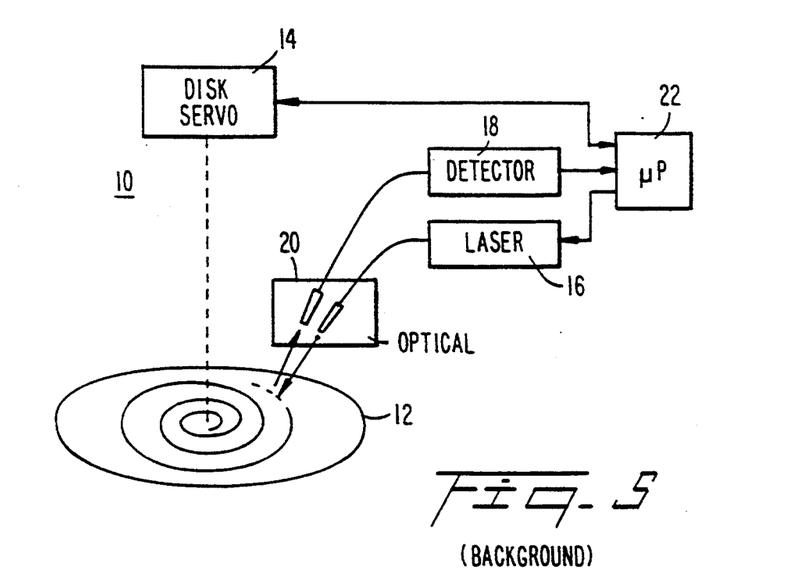
FIG. 5 is a simplified diagram of a conventional optical disk read/write system within which the invention may be implemented.

FIG. 5 is a diagram of an apparatus 10 for reading data prerecorded on an optical disk 12. The disk 12 is rotated by a disk servo 14 comprising a precisely controllable DC motor. A laser 16 irradiates the surface of the disk 12, and light reflected from the disk impinges on the surface of a detector 18. An optical head 20, located between the disk 12 and laser-detector 16, 18 is positioned by another servo (not shown) to read data from a desired track. Writing is carried out using similar optics, with the optical medium being preheated to enable light from laser 16 to form surface marks corresponding to data. The servos and laser/detector are controlled by a microprocessor 22.

The components comprising apparatus 10 shown in FIG. 5 typically are arranged with a common housing, such as provided by SCSI (Small Computer System Interface) resident at a personal computer or other computer requiring storage of a large quantity of data. The data storage capacity of the disk 12 is enhanced in some systems by utilizing both sides of a disk such as a 130 mm (5¼ inch) optical disk.

Data read and write logic, implemented by microprocessor 22 in the representative illustration of FIG. 5, has been carried out by commercially available special function integrated circuits, such as the AM95C96 optical disk controller (ODC), manufactured by Advanced Micro Devices of Sunnyvale, Calif. A system implementing the AM95C96, shown in FIG. 1, comprises ODC 24 reading data through an encoder/decoder (ODE) 28 and a phase locked loop (PLL) 30 off the optical disk and writing to the optical disk. A CPU 32 controls seeking to the desired location on the disk. The ODC/ODE 24, 28 interfaces with CPU 32, working memory 34 and a disk interface 36 to process the applied data signals and transfer commands for compliance with particular specifications such as the X3B11 continuous composite servo (CCS), WORM/ERASABLE optical format developed by ANSI.

The ODC 24 is interfaced to a system bus by host interface unit 38, and is supported by buffer memory 40 and error processor 42. General operation of the system shown in FIG. 1, being known to the prior art, is not described in detail. An improvement integrating the ODC/ODE 24, 26 as a single functional element is described in my copending application Ser. No. 07/813,275, filed concurrently herewith.

Figure 4:
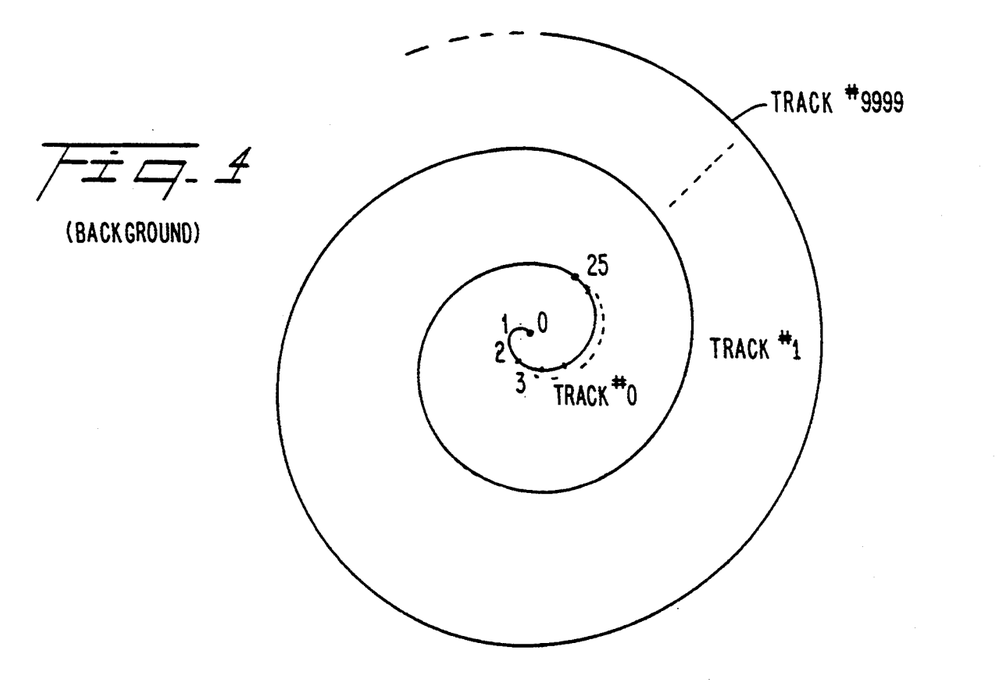
FIG. 4 is a diagram showing the track format of an optical data disk.

FIG. 4 depicts the layout of tracks on an optical disk. The tracks are arranged along a spiral path on the surface of the disk 12, with each turn of the spiral being treated as a separate track. In one example, the optical disk may be 90 mm in diameter, and may contain 10,000 tracks (numbered 0–9999 FIG. 7); each track is divided into twenty-five (25) sectors. Each sector in turn will carry 725 bytes of unformatted data. The optical disk in this example is capable of storing 181,250,000 bytes of data, or about 100,000 pates of text. Modifications include implementing more densely packed sectors, larger diameter disks and/or double-sided storage for enhanced information storage capacity.

Figure 2:
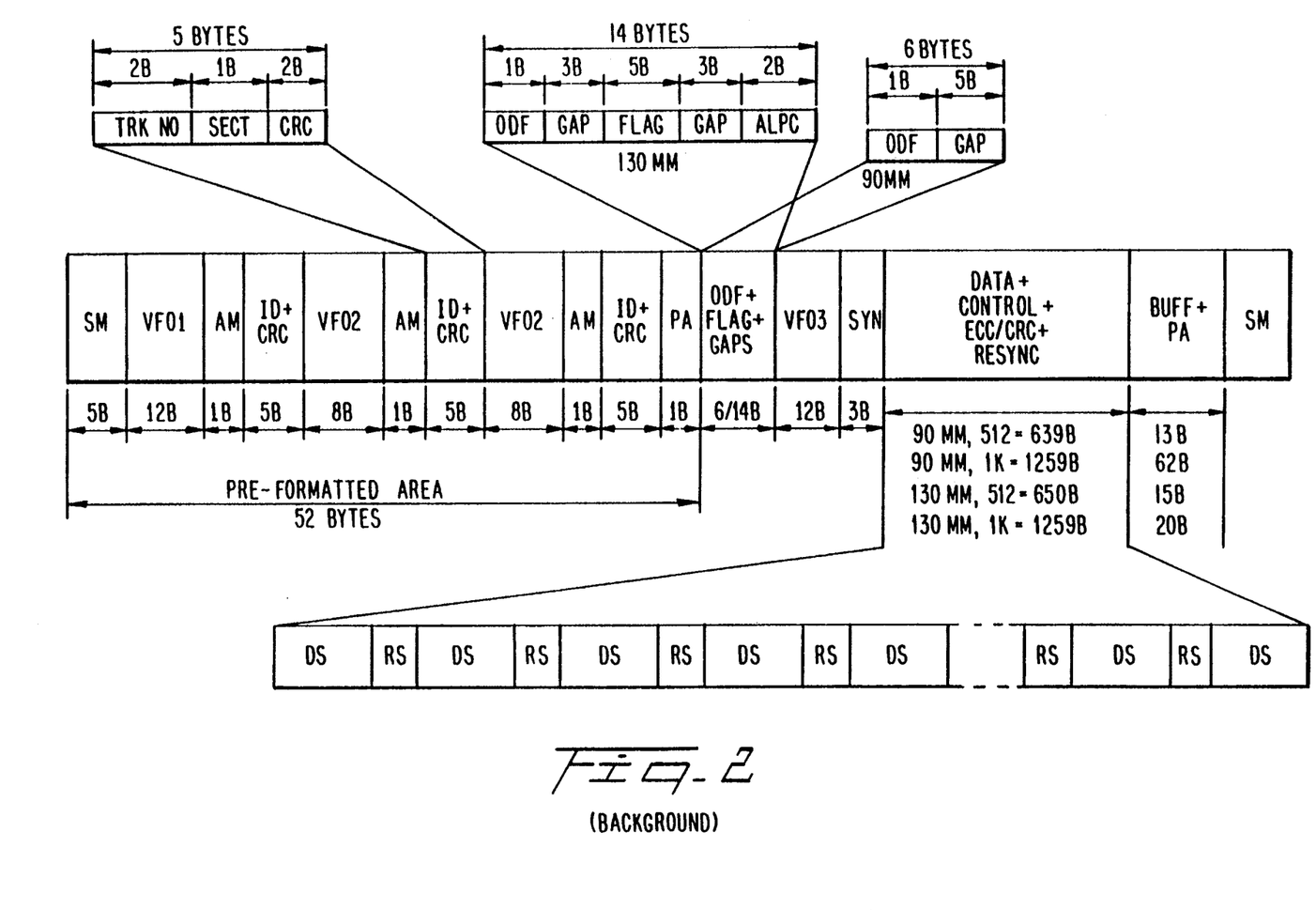
FIG. 2 is a diagram showing X3B11 data format used in the preferred embodiment.

FIG. 2 is a field diagram of the X3B11 format, comprising a header area that is "pre-stamped", followed by a data area for receiving data for storage. The first field of the header is a sector mark (SM) having a special redundant pattern. This field identifies the start of a sector. The SM field as well as the other fields constituting the X3B11 format is summarized below in Table I.

TABLE I

| NAME | FUNCTION | PATTERN |
|---|---|---|
| SM | Sector Mark | 80 channel bits (5 bytes) Special Redundant Pattern = 5 3 3 7 3 3 3 3 5 long burn followed by 0010010010= 1111111110000001111110000000000000011111100000011111100000011111111110 0010010010 |
| VFO1, 2, 3 | Lock up field for PLL | Continuous Pattern<br>VFO1 = 01001001001 . . . 010010<br>VFO2' = 10010010010 . . . 010010<br>VFOI'' = 00010010010 . . . 010010<br>VFO3 = 01001001001 . . . 010010<br>Note: VFO2 varies depending on previous pattern in CRC |
| AM | Address Mark (Bit/Byte Sync) 16 Channel bits. (1 byte) | 0100 1000 0000 0100 |
| ID | Track No. (2 bytes) Sector No. (1 byte) | High order/Low order<br>bits 7–6 = ID Numba (ID 0-2)<br>bit 5 = 0 Reserved<br>bits 4–0 = Sector Number |
| CRC | ID Field Check Bytes (2 bytes) | CRC Polynominal seed = 1's |
| PA | Postamble (one byte) | Allows last CRC and and Data byte closure under RLL (2,7) modulation |
| ODF | Offset Detection Flag (one byte) | Not written, no grooves |
| GAP | Gap (Splice) | Unformatted area |
| FLAG | Indicate Written Block | Continuous Pulse (5 byte area, decision by majority) |

TABLE I-continued

| NAME | FUNCTION | PATTERN |
| --- | --- | --- |
| | | 100100100100100100100100100 ... |
| ALPC | Auto Laser Power Control | Blank 2 bytes zone |
| SYNC | Redundant Sync for Data | Triple sync pattern |
| | | 0100 0010 0100 0010 0010 0010 0100 0100 1000 0010 0100 1000 |
| DATA | User Data, Control, CRC, ECC and RESYNC bytes. | See FIGS. 1.6 and 1.7. |
| BUFFER | Used for RPM timing margins | Not Written area |
| RESYNC | Data Filed byte sync 16 Channel bits (1 byte) | 0010 0000 0010 0100 |

NOTE: All bit patterns show channel code bits in RLL (2,7) modulation.

During both reading and writing operations, ODE 26 detects sector mark (SM) once within each sector. Referring to Table I, the sector mark comprises 80 bits arranged as a long burn followed by a transition pattern. Sector mark decoding is carried out by monitoring the long burn pattern of the track, and identifying a pattern characteristic of the sector mark. A particularly robust algorithm that this purpose is described in my copending application Ser. No. 07/810,574, entitled "Sector Mark Detection in Long Burn Patten for Optical Data Disks," filed concurrently herewith and incorporated by reference.

Detection of the sector mark pattern is a prerequisite to recovery of data from the corresponding sector. It provides synchronization to the region of each sector from which data is to be recovered or is to be written. The data field of each sector resides at a predefined distance, in bytes, from the end of the sector mark pattern. The number of bytes depends on the particular standard involved. For example, in the conventional X3B11 format, shown symbolically in FIG. 2, the pre-stamped, or read only (RO), region extends 47 bytes beyond the sector mark field SM, followed by a magneto-optic region (MO) upon which data can be written once (the MO region is also termed a "WORM", or write once-read many, region). The data region of a 90 mm, 512 byte sector size by convention follows the RO region by ODF and GAP bytes. The next sector mark field follows the data field by a suffer region of 13 bytes for timing margins.

If the sector mark pattern for a sector is not detected because the sector mark pattern is obscured by dirt or is defective for another reason, the data field for that sector cannot be accessed. Prior art optical data disk controllers improve data recovery from optical disks by searching the track of an optical data disk for the presence f sector mark patterns in the appropriate fields, and applying a pseudo sector mark pattern to each sector in which a sector mark pattern is not detected. Upon detection of either a sector mark pattern or generation of a pseudo sector mark, a "sector mark found" signal is issued. In response to this signal, a data recovery routine is initiated to access data from the data field of the current sector. Data recovery from a sector having a defective sector mark field thus is achieved.

However, if the disk has a considerable number of sectors with defective sector marks, the disk itself may be defective, and should not be used. The user should be appraised of the possibly defective quality of a disk before data is written to it.

A feature of the present invention not only recovers from optical data disks having sectors with defective sector marks, but also limits the amount of such data recovered while identifying the user of the presence of an excessive number of sectors with defective sector marks. Another feature inhibits writing to the data field of a sector deemed possibly defective as a result of a defective sector mark field.

Optical data disks are supplied in any of several formats. The format of a new, unmarked disk may have to be ascertained by the user in a procedure termed "certification." However, it is desirable to implement media certification without imposing a requirement for additional equipment. Another feature of this invention, therefore, implements sector mark detection as a mechanism for media certification of an optical data disk.

DISCLOSURE OF THE INVENTION

In accordance with one aspect of the invention, an optical data disk controller optically detects bits from a track of an optical data disk adapted to contain data arranged in sectors. A predefined region of the track is searched for the presence of a pattern of bits corresponding to a sector mark identifying the beginning of each sector from which data is to be recovered. If no sector mark is found, a pseudo sector mark signal is generated to recover data from the sector. Optionally, writing to the data field of a sector for which a pseudo sector mark signal has been generated is inhibited. The pseudo sector mark found signals are counted, and no pseudo sector mark found signals are generated in excess of a predetermined number.

In accordance with another aspect of the invention, using a wide open search window the track of an optical disk is searched for the presence of a normal sector mark pattern. Following detection of the pattern, a predefined region of the next sector where the sector mark pattern is expected is searched using a window of programmable width. A pseudo sector mark signal is generated for each sector in which no sector mark is detected. The search repeats until either a predetermined number of pseudo sector mark signals are generated, a normal sector mark pattern is detected or an exit command is received.

In accordance with still another aspect of the invention, in a constant sector mark mode the disk is searched, with the window wide open, to detect sector mark patterns continuously for media certification.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
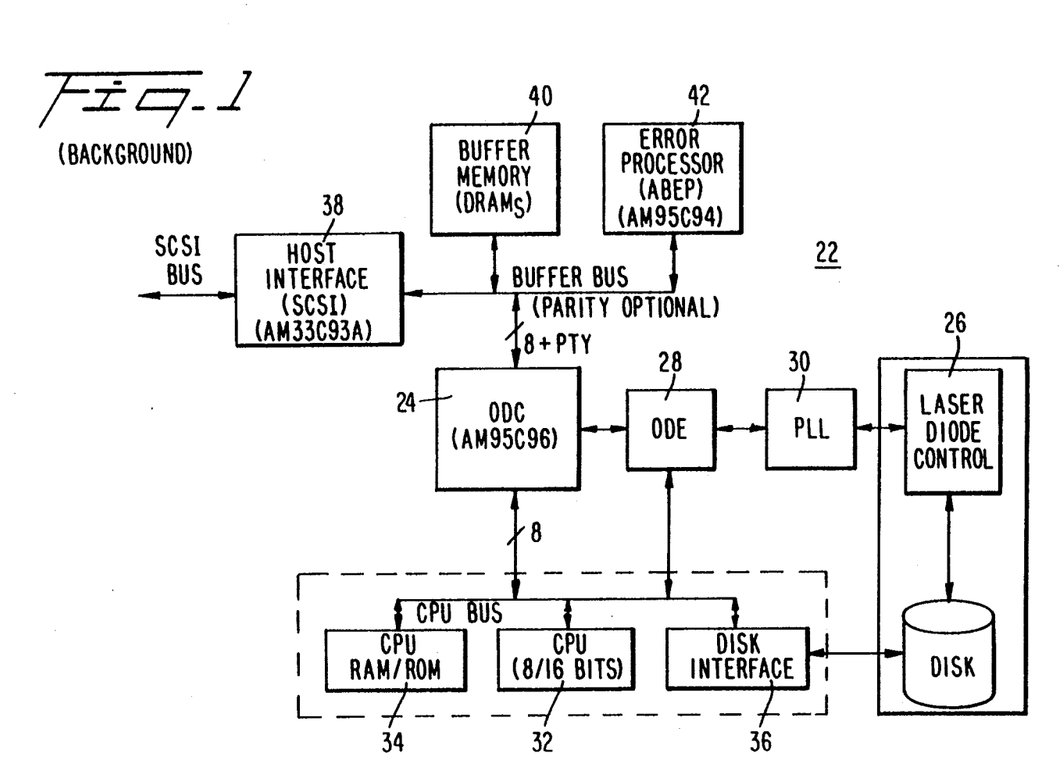
FIG. 1 is a block diagram of an optical disk controller of a type to which sector mark detection and generation of the present invention may be applied.
Figure 3:
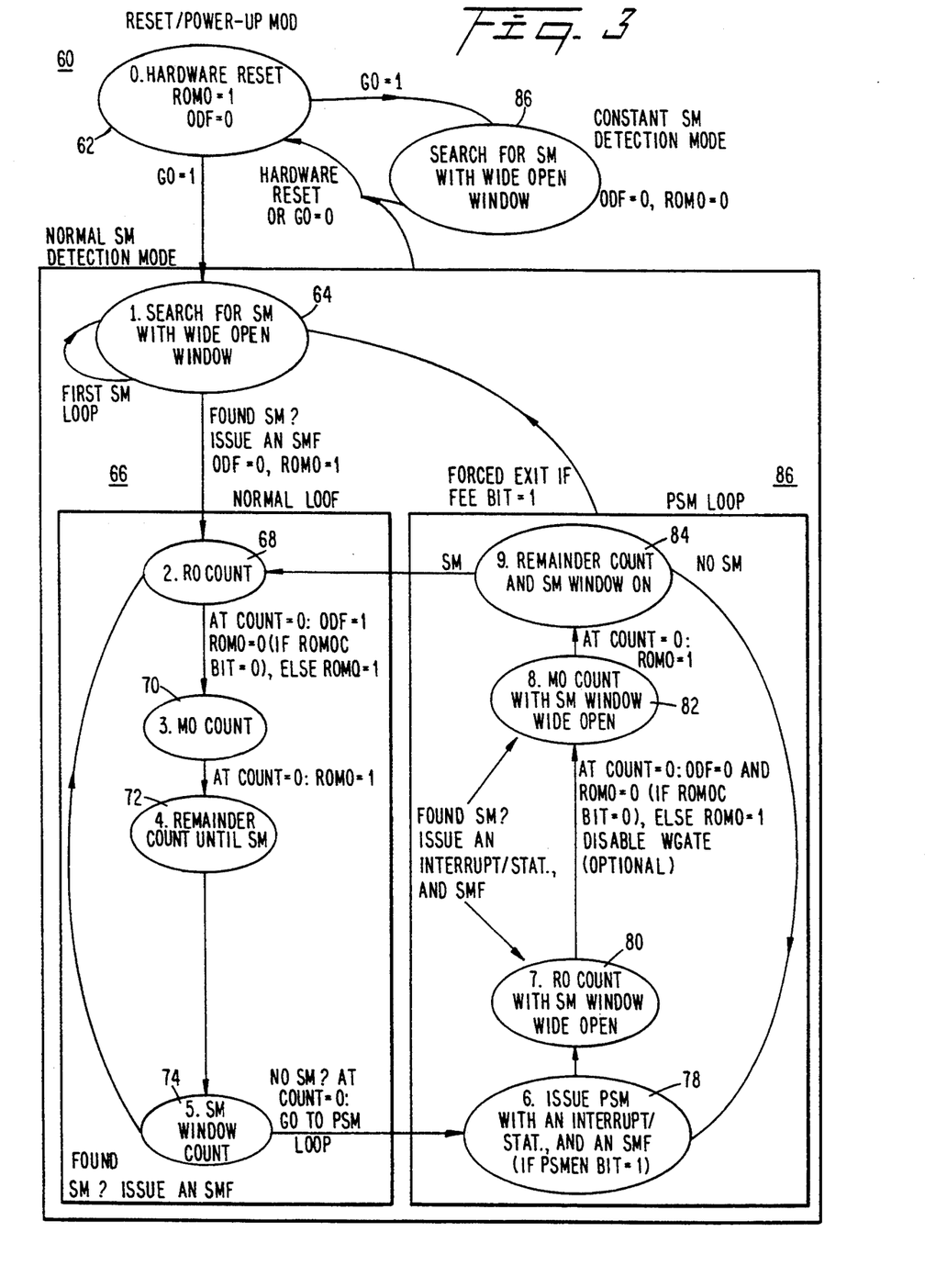
FIG. 3 is a simplified flow chart depicting the sequence of steps for implementing the invention in accordance with the preferred embodiment.
Figure 6:
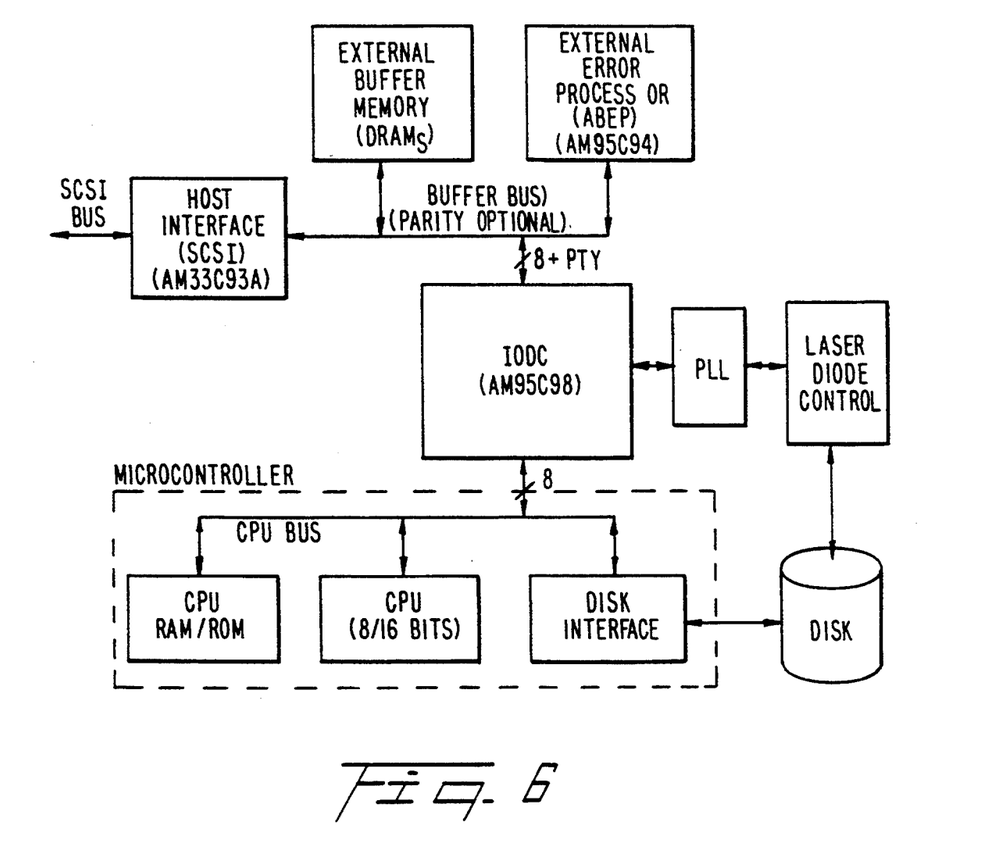
FIG. 6 is an improvement to the conventional system of FIG. 5, with the ODE and ODC units integrated into a single element.

Sector mark pattern detection and pseudo sector mark signal generation is preferably carried out, in accordance with the invention, by programming CPU 32 of the prior art system of FIG. 1 or by the preferred implementation of FIG. 6 described in my copending application. Programming, identified by the numeral 60 in FIG. 3, is characterized by two principal routines or loops, a "normal loop" 66 and a pseudo sector mark (PSM) loop 76. The normal loop 66 is continuously executed while normal sector mark patterns are detected in the sector mark field of successive sectors. The PSM loop 76 is executed to generate pseudo sector mark signals for sectors within which no sector mark pattern has been detected. The program 60 jumps between one loop and the other, dynamically, depending upon the outcome of a sector mark pattern search for each sector of an optical data disk. Another routine, implemented by step 86, carries out media certification by searching for and reporting sector mark patterns continuously.

Referring now to FIG. 3 in more detail, the program 60 first carries out system initialization including a hardware reset routine and setting of initial command states (step 62). The program then enters a first sector mark loop 64, searching for the sector mark pattern with a wide open "search window". The term "wide open" refers to a pattern search without consideration of any predefined region within which the desired pattern or a portion of the pattern is expected to be found. Once a first sector mark pattern is detected anywhere in the medium, a sector mark found (SMF) signal is issued, and program 60 advances to normal loop 66, where the position of the next sector mark field is ascertained by counting down in succession (1) the number of bytes comprising the RO region (step 68), (2) the number comprising the MO region (step 70) and (3) a remainder (step 72) depending upon the format of the standard involved.

Figure 7:
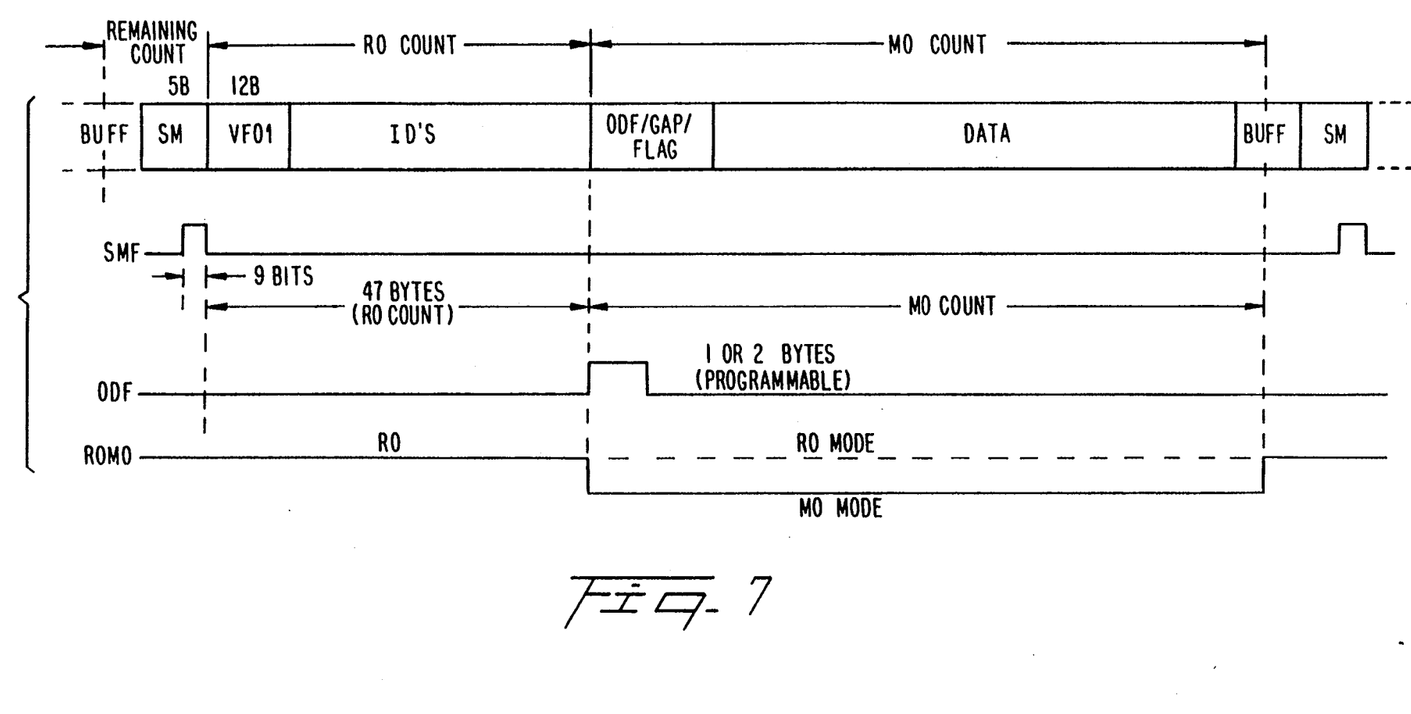
FIGS. 7 is a timing diagram of signals developed during implementation of the invention.

For example, assume that the standard is X3B11, and the disk format comprises a 90 mm disk with a 512 byte sector format. Referring to FIG. 7 and Table II, the pre-formatted region (RO) extending beyond the sector mark field is 47 bytes in length. Accordingly, the RO count for step 68, preprogrammed by the user, is preset to 47 bytes. The magneto-optic region MO, from the beginning of the ODF/GAP/FLAG field to the middle of the buffer field BUFF, is 667 bytes in length. The MO count for step 70 thus is preset to 667. When the RO count and MO count are successively counted down to zero, the remainder of the buffer region, 6 bytes, is counted down to the beginning of the next sector mark field.

The program 60 next searches for a sector mark pattern in the field by opening a search window to a width preprogrammed by the user (step 74). The size of the window establishes the robustness of the search, and in the preferred embodiment the window is programmable between a minimum of 1 byte and a maximum of seven bytes in width. The size of the sector mark window is programmed in accordance with sector format. The size of the window, in accordance with the preferred embodiment, is preprogrammed to have the widths shown in the following Table II.

TABLE II

| SECTOR FORMAT | SECTOR INTERVAL | MO SIZE | SM WINDOW |
|---|---|---|---|
| 512-byte (90 mm) | 725 Bytes | 667 Bytes | ±4 Bytes |
| 1K-byte (90 mm) | 1394 Bytes | 1311 Bytes | ±7 Bytes |
| 512-byte (130 mm) | 746 Bytes | 687 Bytes | ±4 Bytes |
| 1K-byte (130 mm) | 1360 Bytes | 1298 Bytes | ±7 Bytes |

A narrow window will identify a sector mark pattern that occurs in the expected position. A wider window, on the other hand, examines a larger portion of the sector for a sector mark pattern that may be displaced in the sector due to disk rotation speed.

Upon detection of a sector mark, an SMF signal is generated by step 74, and the program returns to step 68 where another sector mark pattern in the next sector mark field is searched. A sector identification sequence is initiated in response to the SMF signal to identify the desired sector. Hence, when the desired sector is identified, data in the data field of the sector is read in the usual manner.

On the other hand, if no sector mark pattern is found, the program jumps from step 74 to the PSM loop 76, where a pseudo sector mark signal is generated. Step 78 issues a PSM found signal and generates an SMF, if preprogrammed. Optionally, an interrupt with status also is supplied. The pseudo sector mark signal initiates the desired sector identification, and hence, data field read.

With the search window wide open (step 80), the RO region is counted down. Upon a countdown to zero, writing to the data field optionally is inhibited, a feature that prevents writing to a sector having a defective sector mark. If this option is not preselected, writing to the data field of a sector having a defective sector mark pattern is carried out. With the search window still wide open, the MO count is next counted down in Step 82. If a sector mark pattern is detected during step 80 or 82, an SMF signal, together with optional interrupt/status signal, is generated, indicating that the sector may possibly be defective (a sector mark pattern should reside only in the sector mark field). However, following step 82, and counting down further by the remainder count in the buffer field BUFF, the presence of the sector mark in the next sector mark field is searched with a wide open window until the remainder count is counted down (step 84).

If a sector mark pattern is detected in step 84, the program returns to step 68 of the normal loop 66 to search for another normal sector mark pattern. If no sector mark pattern is detected, the program returns to step 78 of the PSM loop, another pseudo sector mark signal is generated, and steps 78–84 are repeated. These steps can be repeated indefinitely or a preselected number of times, for example, four times.

The number of pseudo sector mark signals is counted during execution of the PSM loop 76, and if more than the preselected number (e.g., 4) has been generated, the disk is deemed to be possibly defective, and the program exits the PSM loop to return to the first SM loop at step 64, where a normal sector mark is searched with the window wide open. Preferably, an interrupt signal is generated indicating that the preselected count has been exceeded. The data previously read may optionally be discarded as being unreliable.

In accordance with another aspect of the invention, the program may optionally exit the PSM loop if a "forced exit" is pre-programmed. In this case, the program will exit the PSM loop immediately, as shown at step 84 of FIG. 3.

If a medium certification mode was originally selected, following hardware initialization in step 62 the program jumps directly to step 86, where the medium is searched for sector mark patterns with the search window wide open. In this mode, a sector mark found SMP signal is generated each time a sector mark pattern is detected using a wide open detection window. The frequency of sector mark pattern during detection can be monitored by observing the SMF signal to ascertain the format of a disk under test or confirm that the disk is functional. This mode can also be used for customized or any non-X3B11 formats. In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. An optical data disk controller for an optical data disk having tracks adapted to contain data arranged in sectors, comprising:
   means for preprogramming externally a predetermined width of a search window for searching the data in a predefined region of each sector on the optical data disk;
   means for searching the tracks for a pattern of bits corresponding to a sector mark identifying the beginning of each sector from which data is to be read;
   means for generating a pseudo sector mark signal upon determination by said searching means of an absence of a sector mark within the predetermined width of the search window, said searching means includes means for programmably varying the width of said search window in response to said preprogramming means, wherein said pseudo mark signal is generated when no sector mark is detected in previous sectors of the disk using said search window; and
   means for inhibiting generation of further pseudo sector mark signals by said generating means upon generation of a predetermined number of pseudo sector mark signals by said generating means.

2. The controller of claim 1, including means for identifying the predefined region of a sector mark by counting bytes from a sector mark detected for the previous sector.

3. The controller of claim 1, including means for inhibiting writing of data to a sector upon generation of a pseudo sector mark signal.

4. The controller of claim 1, wherein said means for programmably varying the width of said search window provides a plurality of fixed values of said width.

5. An optical data disk controller for an optical data disk having tracks adapted to contain data arranged in sectors, comprising:
   means for searching a predefined region of each sector for a pattern of bits corresponding to a sector mark identifying the beginning of the sector using a search window of a predetermined width, said means for searching including means for varying the width of the search window under search in accordance with a manually preset program; and
   means responsive to said searching means for generating a pseudo sector mark signal upon determination of an absence of a sector mark in the predefined region of each sector, wherein said pseudo sector mark signal is generated when no sector mark is detected in previous sectors of the disk, using said search window.

6. The controller of claim 5, wherein said means for varying the size of the search window comprises means for establishing the width of said window variable from "wide open" to a programmably preselected width.

7. The controller of claim 5, including means for inhibiting writing of data to a sector upon generation of a pseudo sector mark signal.

8. The controller of claim 5, wherein said means for varying the width of the search window provides a plurality of fixed values of said width.

9. A method of detecting a sector mark within a sector with a predefined format of a track of an optical data disk, comprising the steps of:
   (1) searching a first sector for a pattern of bits corresponding to a sector marker;
   (2) generating a "sector mark found" signal upon detection of a sector mark in any region of the first sector;
   (3) searching, in a predefined region of the next sector, for said pattern using a pattern window having a predefined width programmably variable in accordance with the predefined format of the sector;
   (4) if a sector mark is found in said next sector during step (3), generating a "sector mark found" signal;
   (5) if a sector mark is not found during step (3), generating a pseudo sector mark signal, wherein said pseudo sector mark signal is generated when no sector mark is detected in previous sectors of the disk using said search window;
   (6) repeating steps (3)–(4) at least once; and
   (7) reading data stored in any sector for which a "sector mark found" or "pseudo sector mark" signal has been generated.

10. The method of claim 9, wherein step (3) comprises locating the predefined region of said sector by counting bytes from said sector mark in said first sector.

11. The method of claim 9, including the additional step of counting pseudo sector mark signals generated during step (5), and inhibiting further generation of pseudo sector mark signals upon a predetermined count.

12. The method of claim 9, including, following step (5), searching for said pattern within a pattern window having a first width greater than said predefined width, and generating a "sector mark found" signal upon detection of said pattern.

13. The method of claim 12, including thereafter searching for said pattern within a second width greater than said predefined width.

14. The method of claim 9, including the step of inhibiting generation of additional pseudo sector mark signals in excess of a predetermined number.

15. The method of claim 9, including inhibiting writing of data to a sector upon generation of a pseudo sector mark signal.

16. The method of claim 9, wherein said step of searching is carried out using a plurality of fixed values of the pattern window.

17. A method of detecting a sector mark within a sector of a track of an optical data disk, comprising the steps of:
   (1) searching bits obtained from said disk for a pattern of bits corresponding to a sector mark;
   (2) generating a "sector mark found" signal upon detecting a sector mark in any region of a first sector of said disk, and in response, executing a first routine comprising
      (ai) using a search window having a programmably variable width, searching for said pattern of bits in the next sector of said disk within a first predefined width of the search window,
      (aii) if a sector mark is found during step (ai), generating a "sector mark found" signal, and
      (aiii) if a sector mark is not found during step (ai), executing a second routine comprising
      (bi) generating a pseudo sector mark signal, wherein said pseudo sector mark signal is generated when no sector mark is detected in previous sectors of the disk using said search window,
      (bii) searching for said pattern of bits within a second predefined width of the search window different from said first width,
      (biii) if said pattern is found during step (bii), generating a "sector mark found" signal and re-executing the first routine,
      (biv) if said pattern is not found during step (bii), re-executing said second routine; and
   (3) reading sector data stored in any desired sector for which a "sector mark found" or "pseudo sector mark" signal has been generated.

18. The method of claim 17, wherein said second routine further includes counting the number of pseudo sector mark signals generated, and inhibiting further generation of pseudo sector mark signals upon reaching a predetermined count.

19. The method of claim 17, wherein said searching step (1) is carried out without consideration of any predefined region of the disk, said searching step (ai) is carried out using a window having the first predefined width, and said searching step (bii) is carried out using a window having the second predefined width greater than said first predefined width.

20. The method of claim 17, wherein said second routine includes a step of returning to step (1) in response to a preprogrammed instruction.

21. The method of claim 17, including the step of inhibiting writing of data to a sector upon generation of a pseudo sector mark pattern.

22. The method of claim 17, including executing a third routine in response to a preprogrammed instruction, said third routine comprising searching sectors of said disk for said pattern with a wide open detection window and generating "sector mark found" signals in response to detections of said pattern.

23. The method of claim 17, wherein said first predefined width corresponds to less than wide open detection window.

24. The method of claim 23, wherein said second predefined width corresponds to a wide open detection window.

25. The method of claim 17, including generating a mode control signal for operation of the disk either in a read only (RO) mode or in a magneto-optic mode (MO), and further including the step of executing a third routine in response to a preprogrammed instruction, said third routine comprising generating said mode control signal for operating the disk in the MO mode while searching sectors of said disk for said pattern with a wide open detection window and generating "sector mark found" signals in response to detections of said pattern.

26. The method of claim 17, wherein said first and second predefined widths of the search window have fixed values.

* * * * *